INVENTOR
BJÖRN HARALD HEDÉN

July 18, 1961     B. H. HEDÉN     2,992,601
MIRROR REFLEX CAMERAS
Filed Feb. 24, 1958     5 Sheets-Sheet 2

INVENTOR
BJÖRN HARALD HEDÉN
BY Linton and Linton
ATTORNEYS

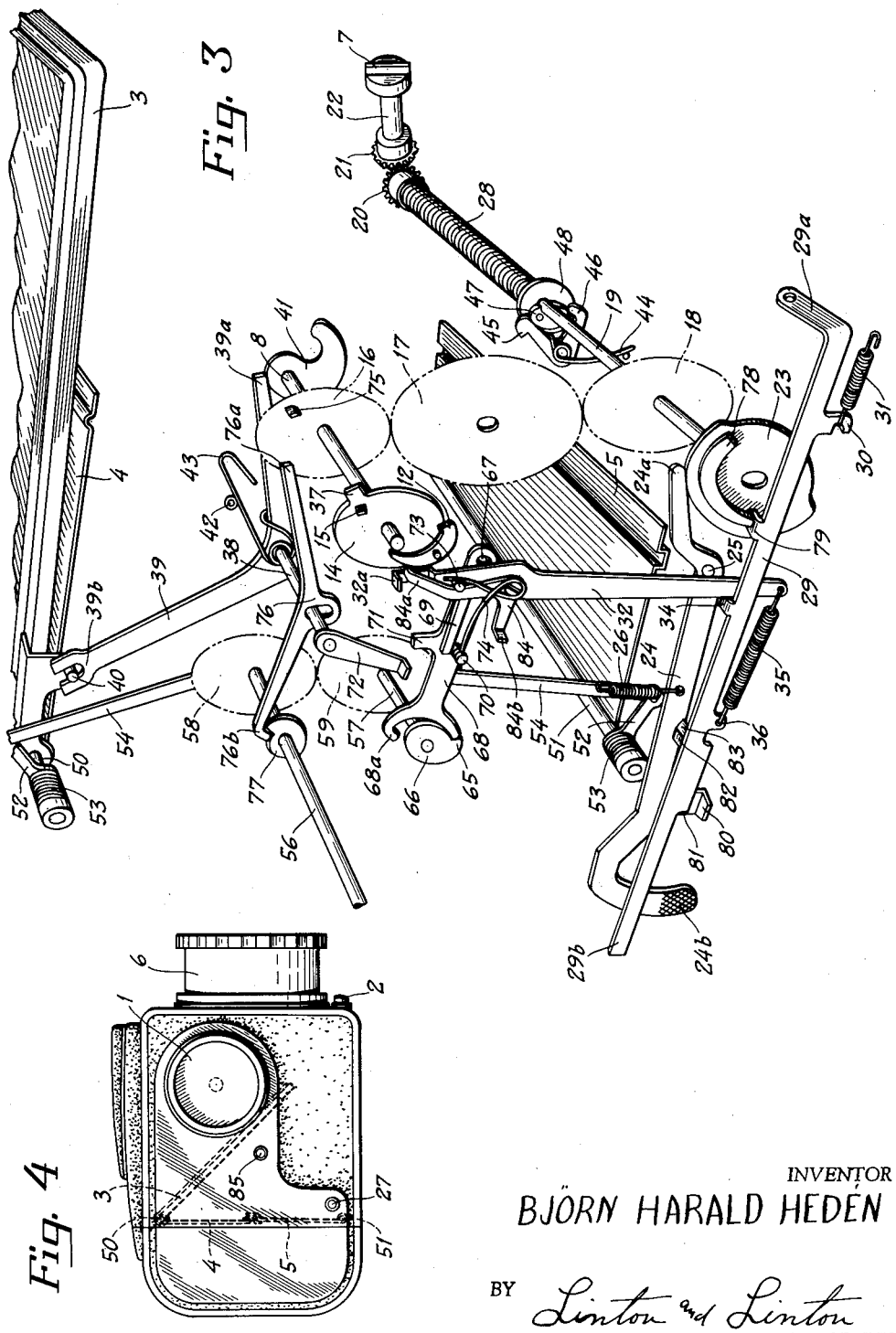

July 18, 1961

B. H. HEDÉN 2,992,601

MIRROR REFLEX CAMERAS

Filed Feb. 24, 1958

INVENTOR
BJÖRN HARALD HEDÉN

BY Linton and Linton
ATTORNEYS

July 18, 1961    B. H. HEDÉN    2,992,601
MIRROR REFLEX CAMERAS
Filed Feb. 24, 1958    5 Sheets-Sheet 5

INVENTOR
BJÖRN HARALD HEDÉN
BY Linton and Linton
ATTORNEYS

United States Patent Office 2,992,601
Patented July 18, 1961

2,992,601
MIRROR REFLEX CAMERAS
Björn Harald Hedén, Goteborg, Sweden, assignor to Fritz Victor Hasselblad, Goteborg, Sweden
Filed Feb. 24, 1958, Ser. No. 717,109
Claims priority, application Sweden Mar. 1, 1957
5 Claims. (Cl. 95—42)

The present invention relates to single lens mirror reflex roll film cameras provided with a lens shutter and of the kind having a manually rotatable knob arranged, when rotated from an initial position to an end position, to set the shutter, feed the film and lower the mirror into focusing position, whereupon a screening device arranged between the mirror and the film opening covers the latter, release means being provided, at the actuating of which the mirror swings back, the screening device uncovers the film opening and the shutter performs the exposure.

In mirror reflex cameras of the above-mentioned kind it takes a certain amount of time for the mirror to swing away and for the screening device to move to the position in which the film opening is uncovered. In spite of the comparative rapidity, with which these operations take place, the time which elapses before the exposure proper, caused by the lens shutter operation, constitutes a disadvantage when rapid movements are to be recorded photographically, such as in sports photography or the like. The present invention has for its object to overcome this drawback by providing a "pre-release" mechanism, by means of which the mirror may be swung away and the screening device opened, whereby the camera will be prepared for an extra rapid exposure, which is made by means of the ordinary release means of the camera.

The invention is mainly characterized in that the camera is provided with extra release means arranged when actuated to cause the mirror to swing back and the screening device to uncover the film opening, whereafter the continued releasing of the camera is stopped before the exposure has been made by the action of an exposure catch co-acting with the movement transmitting means of the camera and arranged, when the first-mentioned release means is actuated, to release said movement transmitting means in order to make the exposure.

In such cameras, in which the camera release means comprises a triggering rod longitudinally displaceable against the action of a spring by means of a release button, said rod being articulated to one end of a pivotally mounted release lever, the opposite end of which is arranged, when the triggering rod is displaced by means of said release button, to cause a release catch to release the movement transmitting means adapted to swing the mirror, etc., the extra release means may preferably comprise an angle lever pivotally mounted adjacent the release lever, one arm of said angle lever having its free end disposed adjacent said release catch, and the opposite arm of said angle lever being provided with a bent end portion extending through a slot in the camera housing, so that the release catch may be released by actuating the end portion of said angle lever accessible from the outside of the camera.

According to one form of the invention, the exposure catch which prevents the continued releasing of the camera after the mirror and screening device have swung away may consist of a rotatably mounted disc which is driven in synchronism with said movement transmitting means when the camera is released and which is provided with a projection or shoulder, a tongue projecting from the triggering rod being situated in the path of movement of said shoulder which, when the mirror and screening device have been swung away, abuts against said tongue, the exposure being made by displacing the triggering rod by means of the release button, so that the tongue is moved out of the path of movement of the shoulder.

In the case where the tongue projecting from the triggering rod in the initial position of the latter is situated beside the path of movement of said shoulder, the release lever is preferably provided with an abutment for one arm of the extra release lever, so that when the latter is actuated in order to release the mirror and screening device, the release lever is caused to swing sufficiently for the end thereof connected with the triggering rod to move the latter to a partly displaced position in which the tongue projecting therefrom is situated in the path of movement of said shoulder, the triggering rod being prevented from returning to its initial position by means of a catch.

One specific embodiment of the invention is characterized in that said disc which is synchronised with the movement transmitting means of the camera is made in the form of a cam plate, one arm of a double-armed lever mounted adjacent the triggering rod for pivoting against the action of a spring resting against said cam plate, said lever being arranged, when the camera is set, to be caused by said cam plate to move to a position in which a projection arranged on its opposite arm will engage a projection on the triggering rod for retaining the same when the latter has been moved to the partly displaced position by actuating of the extra release means, the arrangement being such, that when the continued releasing of the camera is caused by the triggering rod being fully displaced, the cam plate permits said lever to return to its initial position, so that the projection arranged thereon is moved out of engagement with the projection of the triggering rod.

One embodiment of the invention is illustrated in the accompanying drawings, in which FIGURE 1 is an exploded view of a camera according to the invention with the camera housing removed and showing schematically the various movement transmitting members of the camera in position set for exposure.

FIGURE 3 shows the camera prepared for a "quick-release" exposure, that is with the mirror and screening device pre-released, and FIGURE 4 is a side view of a mirror reflex camera with the mirror and the screening device indicated in broken lines.

Figure 1:
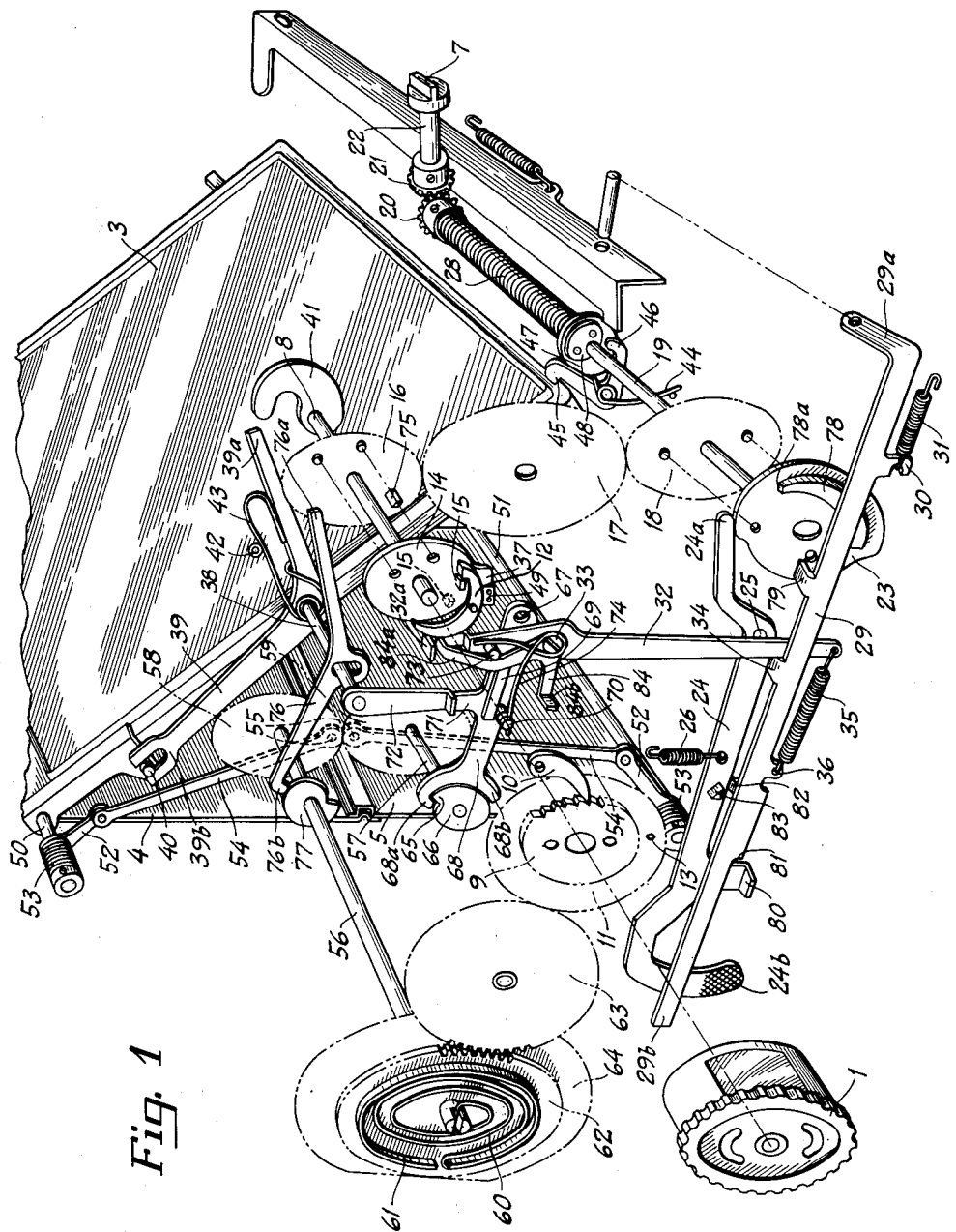
Figure 2:
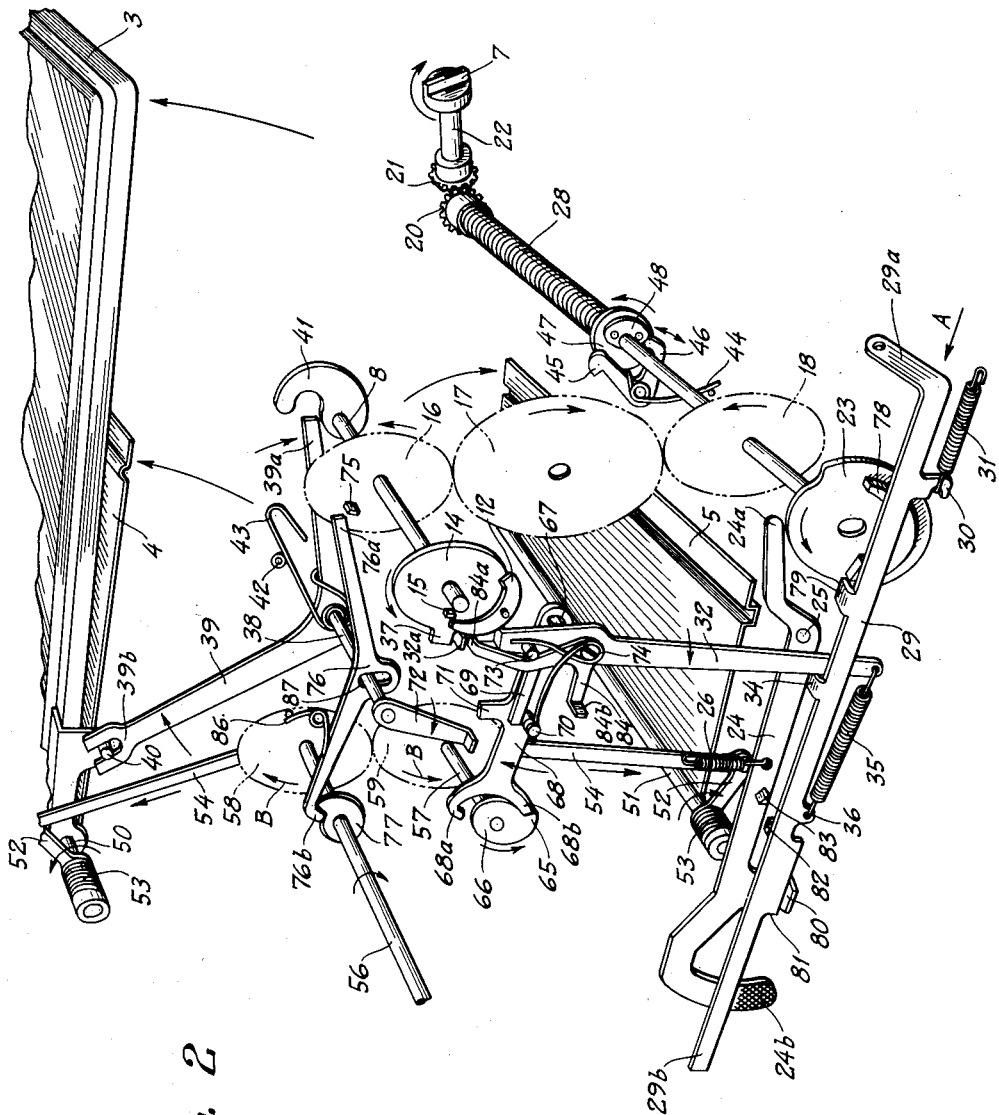
FIGURE 2 is a view similar to FIGURE 1 but showing the various members in another position.
Figure 5:
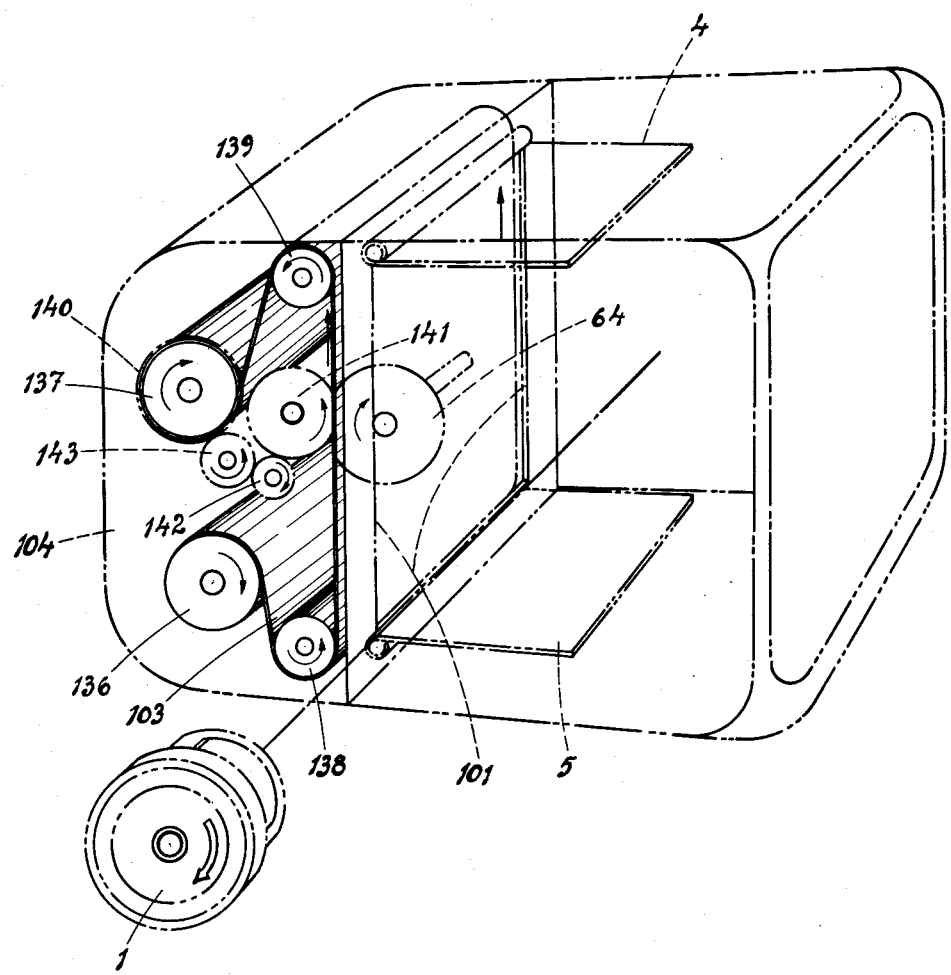
FIG. 5 is a diagrammatic view showing the film feed mechanism.

Preparing the camera for exposure is made by means of a manually rotatable knob 1 (FIGURES 1, 4 and 5). Releasing the camera in order to make the exposure is made by pressing a release button 2 (shown in FIGURE 4 only). The reflex mirror of the camera is indicated in the drawings by the numeral 3. 4 and 5 are screening doors swingably mounted in front of the film opening 101 of the camera (see FIG. 5). The camera shown is provided with an interchangeable objective 6 (see FIGURE 4) which is connected to the camera by means of a coupling of which the member belonging to the camera, the so called objective key 7, is shown in FIGURES 1–3. The corresponding coupling member in the objective is in the form of a slotted disc 102 shown in FIGS. 6–9.

By rotating the knob 1, the shutter spring is charged, the shutter opened and the mirror 3 swung into focusing position. Simultaneously, an unexposed portion of the film 103 in a film magazine 104 is fed behind the film opening 101. When the release button 2 is pressed in order to make the exposure, the following operations are performed in the sequence indicated: the shutter is closed, the mirror is swung upwardly to the position shown in FIGURE 2, the doors 4 and 5 are swung to the position in which they uncover the film opening (see FIGURE 2), the shutter performs the exposure and the doors 4, 5 are swung back into the position in which they cover the film opening.

In order to facilitate the understanding of the functioning of the camera, the different means for effecting the operations listed above will hereinafter be described in greater detail and one at the time.

*Setting and release means*

The knob 1 is attached to a shaft 8 journalled in the camera housing and also connected to a ratchet wheel 9 (see FIGURE 1) which together with a pawl 10 forms a one-way latch for the knob which is also provided with an end position stop, not shown in the drawings. A gear wheel 11 is secured to the ratchet wheel 9 and carries a pawl 12 pivoted as at 13.

Freely rotatable on the shaft 8 is a cam wheel 14 provided with a lateral projection 15 which, when the camera is set, is retained by the pawl 12 carried by the gear wheel 11. After the camera has been released, the projection 15 is situated in the position indicated in dot-dash lines in FIGURE 1 and when the knob 1 is rotated (clockwise according to the drawings), the pawl 12 will engage the projection 15, so that the cam wheel 14 will be rotated along with the knob. On shaft 8 there is further rotatably carried a gear wheel 16 secured to the cam wheel 14. When the knob 1 is rotated, the rotation of said gear wheel 16 will be transmitted through an intermediary wheel 17 to a gear wheel 18 attached to a shaft 19 parallel with shaft 8. The movement is further transmitted to the lens shutter enclosed within the objective (not shown in FIGURES 1-3) through the intermediary of bevel gears 20, 21, a shaft 22 and the objective key 7. At the end of shaft 19 opposite the gears 20, 21, there is attached a cam wheel 23, the periphery of which engages one end 24a of an indicator arm 24 pivoted on a pin 25 in the camera housing against the action of a spring 26. The opposite end 24b of said arm 24 is coloured red and will be visible, when the camera has been released, through a window 27 (see FIGURE 4) arranged in the camera housing. When the camera is set for exposure, the indicator arm occupies the position shown in FIGURE 1, wherein the red-coloured portion is not visible through said window 27. Around the shaft 19 there is further arranged a coil spring 28 which during the rotation of shaft 19 is charged simultaneously with the shutter spring. When the shutter is set, the power from the spring 28 acts upon the pawl 12 via the shaft 19, gear wheels 18, 17 and 16, the cam wheel 14 and the projection 15, as will be apparent from FIGURE 1. The pawl 12 is in turn retained in the position shown by the ratchet arrangement 9, 10 against the action of said spring tension.

Figure 6:
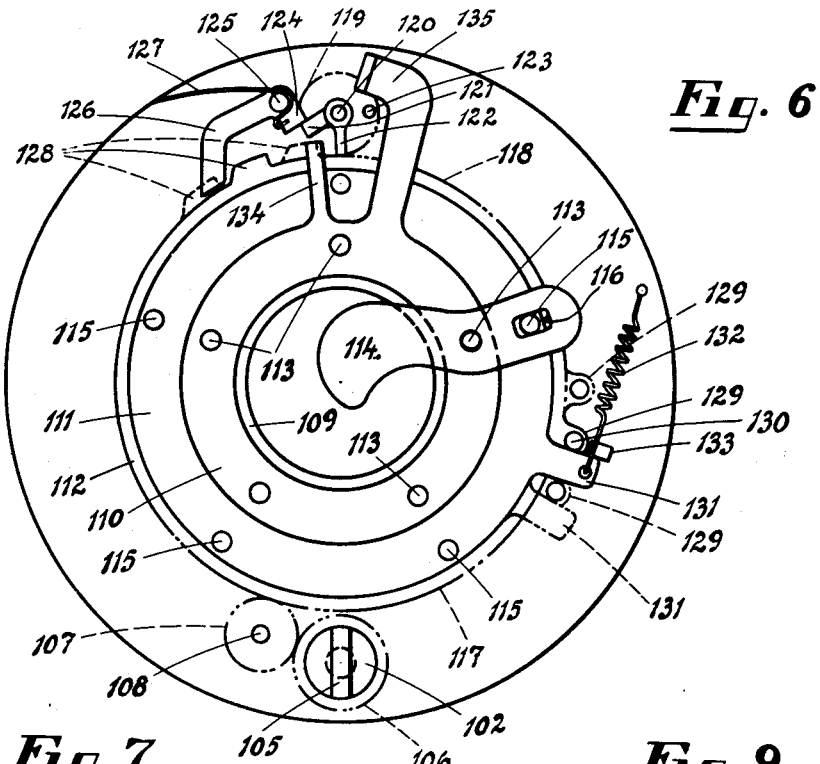
FIG. 6 shows part of the lens shutter and its operating mechanism.

Part of the shutter mechanism is illustrated diagrammatically in FIG. 6. As previously mentioned, the objective key 7 engages a slotted disc 102 in the objective. The disc 102 is attached to one end of a shaft 105 journalled in the objective and this shaft carries at its other end a gear wheel 106 which is in driving engagement with a gear wheel 107 rotatably journalled by means of a shaft 108. Coaxially with the optical axis of the objective there is arranged a tubular hub 109 for three rings 110, 111 and 112. Ring 110 is provided with a number of axially extending pins 113 equally spaced around the ring and serving as pivots for the shutter leaves. For the sake of clarity, only one shutter leaf 114 is shown in FIG. 6. The shutter leaf 114 has an end portion extending over the larger diameter ring 111 which is provided with pins 115 corresponding in number and angular spacing to pins 113 on ring 110. Said pins 115 are each passed through an elongated hole 116 in the end portion of the shutter leaves extending over ring 111, so that the leaves will pivot on pins 113 for closing or opening upon relative rotation between the two rings 110 and 111. The ring 112 is situated behind ring 111, as seen in FIG. 6 and has a somewhat larger outer diameter. The periphery of ring 112 has a toothed portion at 117 meshing with gear wheel 107 and a further toothed portion 118 diametrically opposite portion 117 and engaging a gear wheel 119 on a shaft 120 which also carries two radially projecting and angularly spaced shutter operating levers 121 and 122. These levers, the means by which they are set and operated and the means actuated by the levers for operating the shutter leaves are well known per se and will therefore not be described here in greater detail than necessary for the understanding of the present invention.

Figure 7:
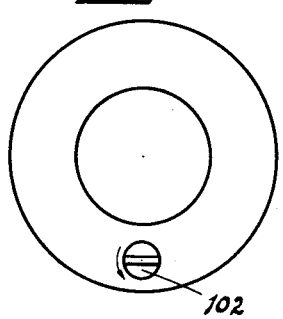
FIGS. 7, 8 and 9 illustrate the shutter in various positions.
Figure 8:
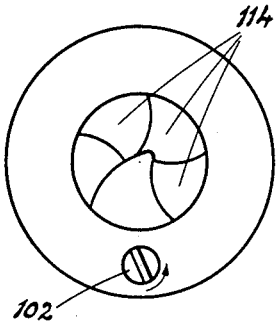
Figure 10:
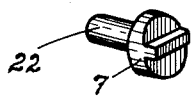
FIGS. 10, 11 and 12 show a coupling member between the camera and the lens shutter in different positions corresponding to the shutter positions of FIGS. 7, 8 and 9, respectively.

When the knob 1 is rotated for setting the camera, the objective key 7 is rotated as described above causing gear wheel 106 to rotate clockwise according to FIG. 6. This rotation is transmitted by means of gear 107 to the ring 112 which will thus rotate clockwise driving gear wheel 119 counter-clockwise. Gear wheel 119 has a laterally projecting pin 123 adapted to engage lever 121 for rotating the levers 121 and 122 from a position now shown to the position shown in FIG. 6 against the action of a shutter operating spring (not shown) when gear wheel 119 is rotated as described. The shutter operating levers 121, 122 are retained in the position shown by one arm 124 of a double-armed lever pivotally journalled at 125 the opposite arm 126 of which is pressed against the periphery of ring 112 by means of a spring 127. Ring 112 is further provided with a radial projection 128 adapted to act upon lever arm 126 when the camera is released as will be described later. A second radial projection 129 on the ring 112 carries a laterally projecting pin 130 adapted for engagement with a short arm 131 extending radially outwards from ring 111. To the outer end of the arm 131 is connected one end of a spring 132 which tends to keep the ring 111 in the position illustrated in FIG. 6 with the arm 131 abutting against a fixed stop 133. In FIG. 6 both projections 128 and 129 are shown in full lines in a middle position, and their end positions which will hereinafter be termed the "clockwise" and "counterclockwise" end positions, respectively, are indicated in broken lines. When the ring 112 is rotated clockwise for setting the shutter operating mechanism, as described above, projections 128 and 129 will be moved to their respective clockwise end positions and the arm 131 on ring 111 will then be moved by the pin 130 on projection 129 from the position shown in full lines to the position indicated in broken lines in FIG. 6. Displacement of the arm 131 will cause a clockwise rotation of ring 111, so that the shutter leaves 114 will be pivoted by the action of the pins 115 on ring 111, the shutter thereby being opened. FIG. 7 illustrates the objective with the shutter opened and also shows the position of the coupling member 102. The corresponding position of the objective key 7 is shown in FIG. 10, and by comparison with FIG. 1 it will be seen that this is the position in which the camera is set for making an exposure.

As previously mentioned, releasing of the camera in order to make an exposure is made by pressing the release button 2 shown in FIGURE 4. The release button abuts against the bent front end 29a of a longitudinally displaceable triggering rod 29. When the release button is pressed, the triggering rod 29 is displaced in the direction indicated by the arrow A in FIGURE 2 against the action of a spring 31, one end of which is attached to a lug 30 on the triggering rod and the other end of which is connected to the camera housing in a manner not shown.

Figure 9:
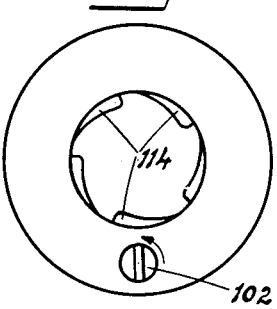
Figure 11:
Figure 12:

A release lever 32, which is pivoted on a pin 33 in the camera housing is retained, before the camera is released, in the position shown in FIGURE 1 by a shoulder 34 on the triggering rod 29. When the triggering rod is pushed inwardly, the shoulder 34 is moved to the left of FIG. 1 and the release lever 32 pivoted and the lower end is simultaneously moved with the triggering rod by means of a coil spring 35 one end of which is attached to a lug 36 projecting from the triggering rod and the other end of which is connected to the lower end of the release lever 32. As is shown in FIGURE 2, the end 32a of the release lever situated opposite the triggering rod will thereby actuate the pawl 12 in such a way, that the projection 15 on the cam wheel 14 is released. Under the action of the spring 28, the movement transmitting means described above will then rotate in the direction indicated by the arrows in FIGURE 2, until a radial projection 37 on the cam wheel 14 abuts against the upper, bent end portion 32a of the release lever 32 (see FIGURE 2). When the release button 2 and thereby also the triggering rod 29 is released, the release lever 32 will be returned to its initial position by the shoulder 34 on the triggering rod, whereby the upper end 32a of the release lever 32 will be moved out of engagement with the projection 37 on the cam wheel 14, so that the cam wheel and all associated members may rotate until the projection 37 abuts against an abutment 49 secured to the camera housing. The red-coloured end 24b of the indicator arm 24 has simultaneously, by the action of cam wheel 23 and spring 26, swung back to its initial position behind the window 27 in the camera housing. When the camera mechanism is released as described above, the objective key 7, via the gear wheels 106 and 107, will rotate the ring 112 in counter-clockwise direction. When the projection 129 on ring 112 moves from its clockwise end position to the middle position shown in FIG. 6, the arm 131 projecting from ring 111 is permitted to move back to the position where it abuts against the fixed stop 133 under the action of the spring 132 so that ring 111 is rotated counter-clockwise thereby closing the shutter leaves. The position of the various parts at this instant is that illustrated in full lines in FIG. 6 and shown also in FIGS. 8 and 11. The corresponding position of the different means within the camera housing is mainly that illustrated in FIG. 3. During the continued rotation of ring 112 the projection 128 thereon moves against the arm 126 of the double-armed lever 124, 126 and pivots the same in clockwise direction so that the shorter lever arm 124 moves out of engagement with the shutter operating lever 121 permitting levers 121 and 122 to rotate in clockwise direction under the action of the previously mentioned shutter operating spring. The lagging arm 122 will then strike against the outer end of an arm 134 extending radially outwards from the ring 110 carrying the pivot pins 113 for the shutter leaves 114 thereby rotating ring 110 in counter-clockwise direction which, due to the displacement of the shutter leaf pivots 113, will cause the shutter leaves to open. Shortly afterwards the leading shutter operating lever 121 will strike against the end of a second arm 135 projecting radially from ring 110 and displace said arm to the right of FIG. 6 thereby rotating the ring 110 in clockwise direction, so that the shutter leaves will close once more. This opening and closing of the shutter causes the exposure of the film. FIG. 9 shows one position of the shutter during the exposure operation and FIG. 12 illustrates the corresponding position of the objective key 7. The corresponding position of the various means within the camera housing is essentially that illustrated in FIG. 2.

*The mirror mechanism*

The reflex mirror 3 is swingably mounted on a shaft 50 carried in the camera housing. A double-armed lever 39 is attached to a rockably mounted shaft 38 which is parallel with shaft 50 and one forked end of said lever engages a pin 40 projecting laterally from the mirror frame. The other lever end 39a is actuable by a cam 41 attached to the same shaft (8) as the knob 1. When the mirror is in its horizontal, inoperative position, the lever 39 occupies the position shown in FIGURE 2. From this position, the mirror is lowered into focusing position through the action of lever 39 which is caused by the cam 41 to swing counter-clockwise according to the drawings against the action of a spring 43 arranged between an abutment 42 in the camera housing and the lever arm 39a. The forked end 39b of the lever will thereby force the pin 40 downwards, so that the mirror is lowered to focusing position, see FIGURE 1. The mirror is locked in this position by means of a pawl 45 which is mounted for pivoting against the action of a spring 44 and which engages the front edge of the mirror. The pawl 45 is provided with an angle arm 46 which co-operates with a cam piece 48 arranged on a wheel 47 attached to the shaft 19, so that when the shaft 19 at the releasing of the camera rotates under the action of the spring 28, the cam 48 causes the pawl 45 to swing away as shown in FIGURE 2 thereby releasing the mirror. The cam 41 will thereby rotate to the position shown in FIGURE 2, so that the lever 39 under the action of the spring 43 may swing to the position shown in FIGURES 2 and 3, whereby the mirror is moved to the inoperative position.

*The screening device*

The object of the screening device covering the film opening of the camera is to provide an effective shielding against light, especially when the mirror is in focusing position whereby light reaches the inside of the camera both through the lens and through the focusing screen. Thanks to the provision of a separate screening device, the mirror mechanism may be made simpler and lighter, since it will not be necessary to arrange any special light-shielding devices along the path of movement of the mirror edges.

In the embodiment shown, the screening device is made in the form of two doors 4 and 5 which are carried by two shafts 50 and 51 rotatably journalled at two opposite edges of the film opening (the upper shaft 50 also supports the reflex mirror). Each of the shafts 50, 51 is provided at one end with a crank lever 52 which is connected to the shaft through the intermediary of a coil spring 53 surrounding the ends of the shaft. Each crank lever is at its free end articulated to a link 54, the opposite ends of which is pivoted on a pin 55 eccentrically mounted on a gear wheel 58 and 59, respectively. The gear wheels 58 and 59 which are in meshing engagement are carried by rotatably journalled shafts 56 and 57, respectively. When the gear wheels 58 and 59 are rotated in the direction indicated by the arrows B in FIGURE 2, the movement of the gear wheels will be transmitted to the shafts 50 and 51 carrying the doors 4 and 5, respectively, through the intermediary of the links 54 and the crank levers 52, and in such a way, that when the gear wheels make one half of a revolution, the doors will be swung through 90° to the position shown in FIGURE 2 in which the film opening is uncovered. When the gear wheels 58, 59 make a further half revolution, the links 54 will move the crank levers 52 back to the initial position, the doors thus being swung back to the position in which they cover the film opening.

Since the crank levers 52 are connected with the door-carrying shafts 50 and 51 through the intermediary of the coil spring 53, the doors may swing inwardly against the action of said coil springs if subjected to a pressure from behind, thereby yielding to such pressure which could otherwise cause damage on the driving mechanism of the doors. This protective measure has been taken because of the fact that the doors will be accessible from behind when the film magazine is removed, for instance when a new film roll is to be inserted.

Driving power for the door mechanism is taken from a helical spring 60 (see FIGURE 1), one end of which is secured in a groove in the end of the shaft 56 carrying the gear wheel 58 and the other end of which is secured to a spring case 61 attached to a gear wheel 62 which is freely rotatable around the shaft 56 and which, through an intermediary gear wheel 63 is in driving engagement with the gear wheel 11 connected with the knob 1. When the knob 1 is rotated in order to set the shutter and lower the mirror, the helical spring 60 will thus also be wound. Simultaneously, an unexposed portion of the film roll 103 (FIG. 5) in the film magazine 104 is fed into position for exposure by a wheel 64 secured to the gear wheel 62. The film feed mechanism will be described below under a separate heading.

The doors 4 and 5 are to remain open only during the exposure proper, after the mirror has swung back into inoperative position. FIGURE 2 shows the camera during exposure. For controlling the movements of the doors, there is arranged an escapement mechanism which permits the gear wheels 58 and 59 to make only one half revolution at the time and which in turn is controlled in part by the release mechanism and in part by the mirror mechanism. The escapement mechanism comprises a snail ratchet wheel 66 having a single tooth 65 secured to the shaft 57 carrying the gear wheel 59, and a locking arm 68 pivoted at 67. The free end of the locking arm 68 is forked and the fork branches 68a and 68b embrace the snail wheel 66, the upper branch 68a being shaped as a hook or pawl adapted for engagement with the ratchet tooth 65, see FIGURE 1. When the camera is set, the locking arm 68 is retained in the position shown in FIGURE 1 by an angle arm 69 projecting from the release lever 32 and abutting against a lateral pin 70 on the locking arm. The locking arm is also retained in this position by means of a stop arm 72 the free end of which engages a projection 71 on the locking arm and which is secured to the same shaft 38 as the lever 39 cooperating with the reflex mirror.

When the camera release button is pressed, the triggering rod 29 will be displaced, as explained above, in its longitudinal direction and thereby cause the release lever 32 to swing to the position shown in FIGURE 2 in order to disengage the pawl 12 from the cam wheel 14. The angle arm 69 of the release lever 32 will then release the locking arm 68 of the escapement mechanism whereby said arm 68 is caused to swing upwardly to the position shown in FIGURE 2 under the action of a spring 74 arranged on the pivot pin 33 of the release lever, one end of said spring acting upon the lateral pin 70 of the locking arm and the other end acting upon a laterally projecting pin 73 on the release lever. However, the locking arm may swing upwardly in the manner described only after that the mirror has been swung to the inoperative position, so that the stop arm 72 connected with lever 39 via the shaft 38 has moved away from the projection 71 on the locking arm, as is shown in FIGURE 2.

When the locking arm 68 swings upwardly, its upper fork branch 68a will release the ratchet tooth 65, so that the shaft 56 and thereby also the gear wheels 58 and 59 and the snail wheel 66 are permitted to rotate under the action of the helical spring 60 in order to open the doors 4 and 5. As explained above, the doors will be fully opened when the gear wheels 58, 59 have made one half revolution, whereby the ratchet tooth 65 abuts against the lower branch 68b of the locking arm, the door mechanism thereby being arrested in said position.

In order to prevent the shutter from performing the exposure before the doors 4, 5 have completely uncovered the film opening, the gear wheel 16 connected with the cam wheel 14 is provided with a lateral projection 75 which, in case the doors are not completely opened, will abut against one end 76a of a double-armed lever 76 which is freely rockable on the shaft 38. The opposite end 76b of said lever 76 is resting against the periphery of a cam plate 77 secured to the shaft 56 comprised in the driving mechanism for the doors 4, 5. The lever end 76b is retained in the position described by means of a spring 86 which, for the sake of clarity, is shown only in FIGURE 2. When the projection 75 abuts against the lever end 76a all the moving parts between and including the cam wheel 14 and the lens shutter are arrested. The projection 75 is stopped by the lever arm 76a until the gear wheels 58, 59 of the door mechanism have completed the half revolution necessary for fully opening the doors 4 and 5. In this position (see FIGURE 2) the lever end 76b falls down on to the portion of the cam plate 77 having a smaller diameter, the lever arm 76a thereby swinging away from the projection 75, so that the shutter may complete its movement for making the exposure. The lever 76 is carried on the shaft 38 by means of an elongated hole 87 which makes it possible for the projection 75 to pass the lever end 76a by lifting the whole lever against the action of the spring 86 when the camera is set by rotating the knob 1.

When the release button is released after the exposure, the triggering rod 29 will be returned to its initial position by the spring 31. The shoulder 34 projecting from the triggering rod will then move the release lever 32 back to the initial position, whereby the angle arm 69 of the release lever will act upon the pin 70 and thereby swing the locking arm 68 of the escapement mechanism downwards. The lower locking arm branch 68b will then release the ratchet tooth 65, so that the gear wheels 58, 59 are permitted to make another one half of a revolution under the action of the spring 60 in order to move the screening doors to closed position. After one half revolution, the ratchet tooth 65 will again enage the upper locking arm branch 68a, so that the door mechanism is stopped.

The film feed mechanism

As previously described, rotation of the knob 1 causes rotation of the gear wheel 64 adapted to drive the film feed mechanism. As shown in FIG. 5, the film magazine 104 encloses a film supply spool 136 and a take-up spool 137, the latter being mounted above and in parallel with spool 136. Two guide rollers 138 and 139 are mounted adjacent the lower and upper edges, respectively, of the film opening 101. The film 103 passes from the supply spool 136 over roller 138, behind the film opening 101 and over roller 139 to the take-up spool 137. A gear wheel 140 is connected to the take-up spool 137 and is adapted to be driven by gear wheel 64 via three idle wheels 141, 142 and 143. Thus, each time the setting knob 1 is rotated, the take-up spool rotates, so that a portion of the film is wound thereupon and, consequently, an unexposed portion of the film roll is fed from the supply spool 136 to behind the film opening 101.

Safety catches etc.

Besides the catches described above there is arranged a catch for preventing double release of the door mechanism. If the triggering rod should be pushed inwardly when the camera is not set, the escapement mechanism 66, 68 would be caused to release the driving mechanism of the doors which would open completely or partly, depending on the power remaining in the helical spring 60. The doors would then not serve their intended purpose as a light shield when the camera is once more set for exposure, i.e. when the mirror is lowered into focusing position and the lens shutter opened. In order to prevent such actuation of the triggering rod when the camera is not set, the indicator arm 24 is provided with a flanged portion 80 which is in the path of a shoulder 81 on the triggering rod whereby movement of said rod towards its triggering position is prevented by shoulder 81 being stopped by striking flange portion 80. When the camera is set for exposure, that is when the hand knob 1 is rotated, the cam wheel 23 is rotated clockwise according to the drawings from approximately the position shown in FIGURE 3, to the position shown in FIGURE 1, whereby the end 24a of the indicator arm will be raised by the portion of the cam wheel having greater diameter. The opposite end 24b of the indicator arm will then be swung downwardly, so that the flange 80 is moved away from the shoulder 81 on the triggering rod, see FIGURES 1 and 2 so that said rod can be moved completely to its triggering position. After the exposure of the film is completed, cam wheel 23 is rotated and indicator arm 24 pivoted raising end 24b under the action of spring 26 again placing flange 80 in the path of shoulder 81.

On the cam wheel 23 there is arranged an eccentric cam segment 78. When the cam wheel rotates and the triggering rod is pushed inwards to the left of FIG. 1 a laterally projecting tongue 79 on the triggering rod will rest against the cam segment 78 which is so shaped that during the rotation of the cam wheel the cam segment will push the triggering rod still further backwards, so that the rear end 29b of the triggering rod reaches into the film magazine where it will activate an indicating mechanism (not shown) which shows whether or not the portion of the film roll situated behind the film opening is exposed.

On the sides of the triggering rod 29 and the indicator arm 24 facing each other there are arranged two triangular projections 82 and 83, respectively, said projections having beveled surfaces facing each other, so that when the triggering rod is pushed inwardly its projection 82 will slide on the projection 83 arranged on the indicator arm. The triggering rod is not movable in vertical direction, whereas the indicator arm may be pressed downwardly a short distance against the action of the spring 26. When the projection 82 on the triggering rod has passed the projection 83 on the indicator arm, the latter will swing back under the action of spring 26, so that the projection 83 will become situated in front of the projection 82. In this position (see FIGURE 3) the triggering rod will thus be prevented, by the action of the projections 82, 83, from returning to its initial position. Otherwise the tongue 79 on the triggering rod co-operating with the cam segment 78 on the cam wheel 23 might become positioned inside of the cam segment instead of outside thereof, which would cause, on the one hand, the doors to begin swinging back to the closed position before the exposure has been completed, and on the other hand, the activating of the indicating mechanism in the film magazine caused by the rear end of the triggering rod not taking place. Assuming that the triggering rod occupies the position mentioned, with the projections 82, 83 in locking engagement, the tongue 79 co-operating with the cam segment 78 will instead be situated right in the path of movement of the cam segment, so that the transmission of movement from the lens shutter is interrupted when the end 78a of the cam segment abuts against the upper side of the tongue 79. In this position the mirror is in the inoperative position and the doors 4, 5 are opened, but the exposure can be completed only after that the triggering rod has been pushed inwardly somewhat further, so that the cam segment 78 and all associated members may continue their movement. When the cam wheel has rotated sufficiently for the end 24a of the indicator arm to fall down on to the portion of the cam wheel having smaller diameter, the opposite end of the indicator arm will swing upwardly under the action of the spring 26, so that the projection 83 is lifted out of engagement with the projection 82 and the triggering rod is thereby permitted to return to its initial position under the action of the spring 31.

The camera cannot be released before the tongue 79 has passed the path of movement of the cam segment 78 (and the projection 82 on the triggering rod thus has passed the projection 83 on the indicator arm), because in the initial position, the upper end 32a of the release lever is situated at a certain distance from the pawl 12.

On the same pin 33 as the release lever 32 there is pivoted an extra release means in the form of an angle lever 84. One end 84a of said lever 84 is positioned near the upper end of the release lever adjacent the pawl 12 and the opposite arm has a bent end portion 84b which extends through a slot in the camera housing not shown in the drawings and to which there is attached a button 85 situated on the outside of the camera, see FIGURE 4. By means of this button, the lever 84 may be pivoted, so that the pawl 12 is released by the arm 84a moving to the right of FIG. 1 abutting against the pin 73 on the release lever 32 and thereby pivots the latter so far, that its lower end which engages the shoulder 34 on the triggering rod will move the triggering rod to the position described above in which the projections 82 and 83 arranged on its triggering rod and the indicator arm 24, respectively, arresting the outward movement of said triggering rod. In this position the tongue 79 projecting from the triggering rod is situated in the path of movement of the cam segment 78, so that the release mechanism is stopped by the end 78a of the cam segment abutting against the tongue 79, after the mirror has been swung back and the screening doors opened. By releasing the mirror and the screening doors by means of the button 85 and the lever 84, it will thus be possible to prepare the camera for an extra rapid exposure. The exposure is made by pushing the triggering rod all the way in by means of the release button 2, so that the tongue 79 is moved out of the path of movement of the cam segment 78, the release mechanism thereby being permitted to continue the release operation.

The invention is not limited to the embodiment hereinbefore described and as shown in the accompanying drawings, said embodiment being susceptible of various modifications with respect to its details, without departing from the scope of the invention.

What I claim is:

1. A single-lens mirror reflex roll film camera provided with a lens shutter and of the kind having a manually rotatable knob for setting the shutter, feeding the film behind a film opening and lowering the mirror into focusing position, said camera including a mirror, a screening device pivotally positioned between the mirror and the film opening and being capable of covering the latter when the mirror is in its focusing position, shutter operating means to be set by said knob, spring driven means operatively connected to the mirror for moving the same to its non-focusing position, to the screening device for moving the same to its film opening uncovering position and to the shutter operating means for operating the same to release the shutter to perform the exposure, means for releasing said spring driven means, a manually operable triggering rod for actuating said release means, said spring driven means being connected to said knob for being set thereby prior to being released, extra manually operable release means for actuating said spring driven means independently of said rod for moving the mirror to its non-focusing position and the screening device to its film opening uncovering position, an exposure catch connected to said shutter operating means and capable of engaging said rod for preventing the operation of said shutter and the exposure of the film upon said extra release means being actuated, said exposure catch being operatively connected to said spring driven means for being driven therewith releasing said shutter operating means in order to make the exposure upon said rod being moved from engagement with said exposure catch.

2. A camera as claimed in claim 1, wherein said spring driven means comprises means for moving the mirror to its non-focusing position, means for releasing the shutter operating means, a release catch connected to said mirror moving means and said shutter releasing means for preventing their functioning, a release lever pivotally mounted for acting upon said release catch in order to release said mirror moving means and said shutter releasing means, and said triggering rod being mounted for longitudinal displacement and adapted to engage and pivot said release lever for acting upon said release catch, and said extra manually operable release means comprising a pivotally mounted angle lever, one arm thereof being adapted when pivoted to act upon said release catch in order to release said means retained by said catch, the opposite arm of said angle lever having an end portion manually operable from the outside of the camera for pivoting said angle lever.

3. A camera as claimed in claim 1, wherein said spring driven means comprises means for moving the mirror to its non-focusing position, means for releasing the shutter operating means, a release catch for preventing the operation of said mirror swinging means and said shutter releasing means, said triggering rod being longitudinally displaceable, a spring tending to retain said rod against displacement, a release button for longitudinally displacing said rod, said rod further being operatively connected with said release catch for releasing said means retained by said catch upon displacement of said rod, and said exposure catch comprising a rotatably mounted disc adapted to be driven in synchronism with said mirror swinging means and said shutter releasing means, said disc having a projection, a tongue projecting from said triggering rod and being disposed in the path of movement of said disc projection, so that, upon rotation of said disc, said disc projection abuts against said tongue, after the mirror and screening device have been moved away, and said tongue being adapted to be moved out of the path of movement of said disc projection upon displacement of said triggering rod, so as to permit further rotation of said disc.

4. A camera as claimed in claim 1, wherein said spring driven means comprises means for moving the mirror to its non-focusing position, means for releasing the shutter operating means, a release catch for preventing the operation of said mirror swinging means and said shutter releasing means, said triggering rod being longitudinally displaceable, a spring tending to retain said rod against displacement, a release button for longitudinally displacing said rod, said rod further being operatively connected with said release catch for releasing said means retained by said catch upon displacement of said rod, and said exposure catch comprising a rotatably mounted disc adapted to be driven in synchronism with said mirror swinging means and said shutter releasing means, said disc having a projection, a tongue projecting from said triggering rod and being disposed in the path of movement of said projection, so that, upon rotation of said disc, said disc projection abuts against said tongue, after the mirror and screening device have been moved away, and said tongue being adapted to be moved out of the path of movement of said disc projection upon displacement of said triggering rod, so as to permit further rotation of said disc and catch means for preventing said triggering rod from returning to its initial position.

5. A camera as claimed in claim 1, wherein said spring driven means comprises means for moving the mirror to its non-focusing position, means for releasing the shutter operating means, a release catch for preventing the operation of said mirror swinging means and said shutter releasing means, said triggering rod being longitudinally displaceable, a spring tending to retain said rod against displacement, a release button for longitudinally displacing said rod, said rod further being operatively connected with said release catch for releasing said means retained by said catch upon displacement of said rod, and said exposure catch comprising a rotatably mounted disc adapted to be driven in synchronism with said mirror swinging means and said shutter releasing means, said disc having a projection, a tongue projecting from said triggering rod and being disposed in the path of movement of said disc projection, so that, upon rotation of said disc, said disc projection abuts against said tongue, after the mirror and screening device have been moved away, and said tongue being adapted to be moved out of the path of movement of said disc projection upon displacement of said triggering rod, so as to permit further rotation of said disc, said disc being in the form of a cam plate, a double-armed lever being pivotally mounted adjacent said triggering rod, a spring tending to retain said double-armed lever against pivoting, one arm of said double-armed lever being in engagement with said cam plate, a projection being arranged on the opposite arm of said lever, a projection being arranged on said triggering rod adjacent said first-mentioned projection, the arrangement being such, that upon said shutter operating means being set said cam plate causes said double-armed lever to pivot thereby bringing its projection thereon into engagement with said triggering rod projection, when said triggering rod has been partly displaced by said release lever, and upon continued displacing of said triggering rod, said cam plate permits said double-armed lever to return to its initial position, thereby moving its projection out of engagement with said triggering rod projection.

References Cited in the file of this patent

UNITED STATES PATENTS 2,230,251    Jochum                Feb. 4, 1941